US008042570B2

(12) United States Patent
Shindo

(10) Patent No.: US 8,042,570 B2
(45) Date of Patent: Oct. 25, 2011

(54) STEAM VALVE ASSEMBLY AND STEAM TURBINE PLANT

(75) Inventor: Osamu Shindo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 330 days.

(21) Appl. No.: 12/332,905

(22) Filed: Dec. 11, 2008

(65) Prior Publication Data

US 2009/0159141 A1 Jun. 25, 2009

(30) Foreign Application Priority Data

Dec. 25, 2007 (JP) ................................ 2007-332057

(51) Int. Cl.
*G05D 16/06* (2006.01)

(52) U.S. Cl. .................................... 137/613; 137/637.2

(58) Field of Classification Search .................. 137/613, 137/637.2, 241, 238
See application file for complete search history.

(56) References Cited

U.S. PATENT DOCUMENTS

| | | | | |
|---|---|---|---|---|
| 1,761,467 | A * | 6/1930 | Cook | 137/613 |
| 2,224,290 | A * | 12/1940 | Corbin, Jr. | 137/613 |
| 6,637,207 | B2 * | 10/2003 | Konezciny et al. | 137/613 |
| 6,748,932 | B1 * | 6/2004 | Sorter et al. | 137/484.2 |
| 7,284,569 | B2 * | 10/2007 | Takemaru | 137/613 |

FOREIGN PATENT DOCUMENTS

| | | | |
|---|---|---|---|
| JP | 57-152405 | U | 3/1981 |
| JP | 63-82002 | U | 5/1988 |
| JP | 10-176502 | A | 6/1998 |
| JP | 2003-207071 | A | 7/2003 |
| JP | 2005-048639 | A | 2/2005 |
| JP | 2006-183582 | A | 7/2006 |
| JP | 2007-092123 | A | 4/2007 |

* cited by examiner

*Primary Examiner* — Kevin Lee
(74) *Attorney, Agent, or Firm* — Foley & Lardner LLP

(57) ABSTRACT

A steam valve assembly has a main-steam stop valve, and a steam control valve connected downstream to the main-steam stop valve via an intermediate flow path. The two valves each has a casing having an inlet port directing horizontally, and an outlet port directing vertically. The valve bodies and the valve stems move up and down in the casings to open and close the flow paths in the valves. The intermediate flow path is configured to guide main steam from the outlet port of the main-steam stop valve in vertically downward direction to the inlet port of the steam control valve in horizontal direction.

10 Claims, 4 Drawing Sheets

STEAM VALVE ASSEMBLY AND STEAM TURBINE PLANT

CROSS-REFERENCE TO RELATED APPLICATIONS

This application is based upon and claims the benefits of priority from the prior Japanese Patent Applications No. 2007-332057, filed in the Japanese Patent Office on Dec. 25, 2007, the entire content of which is incorporated herein by reference.

BACKGROUND OF THE INVENTION

The present invention relates to a steam valve assembly having a main steam-stop valve and a steam control valve, and to a steam turbine plant that has the steam valve assembly.

In a typical conventional steam turbine plant, the steam coming from the boiler is applied to the steam turbine through the steam valve assembly. The steam that has done work in the steam turbine is changed back to water in the condenser. The condensed water is then supplied by the water pump to the boiler. Water is thus circulated in the steam turbine plant. The steam valve assembly has a main-steam stop valve and a steam control valve that is arranged downstream of the main-steam stop valve. The main-steam stop valve can instantaneously stop steam flowing into the steam turbine if abnormality develops in the steam turbine. The steam control valve is configured to control the flow rate at which stream is supplied to the steam turbine.

In the typical conventional steam turbine plant, the main-steam stop valve and the steam control valve are integrated, forming a single unit. Various structures of combinations of the two types of valves have been proposed in the art.

For example, a main-steam stop valve of horizontal type (laid horizontal) and a steam control valve if vertical (standing vertical) type may be combined as disclosed in Japanese Patent Application Laid-Open Publication No. 2006-183582, FIG. 8 (the entire content of which is incorporated herein by reference). In this case, the valve body of the main-steam stop valve is driven by a hydraulic cylinder arranged beside a side cover, via a valve stem that penetrates the side cover and extends horizontally. Further, the valve body of the stream control valve is driven by another hydraulic cylinder arranged above the top cover (or below the bottom cover), via another valve stem that penetrates the top (or bottom) cover and extends vertically.

In some steam valve assemblies hitherto used, both the main-steam stop valve and the steam control valve are vertical (standing vertical types) as disclosed in Japanese Patent Application Laid-Open Publication No. 2006-183582, FIG. 8 and FIG. 12; Japanese Patent Application Laid-Open Publication No. 10-176502, FIG. 1; and Japanese Utility Model Application Laid-Open Publication No. 63-82002 (the entire contents of which are incorporated herein by reference). In such a steam valve assembly, the valve body of either the main-steam stop valve or the steam control valve is driven by a hydraulic cylinder arranged above the casing, via a valve stem that extends vertically and penetrates the casing. On the other hand, the valve body of the other valve is driven by another hydraulic cylinder arranged below the casing, via another valve stem that extends vertically and penetrates the casing.

Of the conventional steam valve assemblies described above, that one which uses a main-steam stop valve of horizontal type (laid horizontal) and a steam control valve of vertical (standing vertical) type are combined is disadvantageous in the following respects, because the valve stem of the horizontal-type (laid horizontal) valve extends in horizontal direction.

(1) Since the valve stem bends due to the weight of the valve body, the valve body at the distal end of the valve stem cannot fully contact the valve seat, possibly failing to block the steam flowing to it. Consequently, the contact between the valve body and the valve seat must be adjusted to compensate for the bend of the valve stem. This requires much skill and long time on the part of the person who assembles the steam valve assembly.

(2) While the horizontal-type (laid horizontal) valve is being removed in order to accomplish periodical inspection of the valve in power plants, no wire ropes cannot be wrapped around the valve until the valve body and valve stem are pulled out in horizontal position, completely from the casing of the steam valve assembly. Further, the center gravity of the valve body and the valve stem cannot be determined while they are being pulled out. Inevitably, the persons who are holding and removing the valve cannot help but take unnatural positions. This is undesirable from a viewpoint of labor safety management. This also decreases the efficiency of the maintenance work.

Not a combination of a valve of horizontal type (laid horizontally) and a valve of vertical type (laid vertically), but a combination of a main-steam stop valve and a steam control valve, both being conventional vertical (standing vertical) type, may be used as a steam valve assembly. In a steam valve apparatus that is a combination of the two conventional vertical type valves, however, any one of the valve stems that slide up and down through the casings of the main-steam stop valve and steam control valve extend toward downstream side of the valve seat. Preferably, most valve apparatuses should have no components that may cause a pressure loss downstream of any valve seat. In a steam valve assembly, which is a combination of the two conventional vertical (standing vertical) type valves, the valve stem of the two steam-stop valve or steam control valve makes an obstacle to the flowing steam when the valve is opened. This inevitably results in a large pressure loss.

BRIEF SUMMARY OF THE INVENTION

The present invention has been made in view of the disadvantages of the prior art described above. An object of the invention is to provide a steam valve assembly which can be maintained at high efficiency and in which the pressure loss when the valve is in an open position can be reduced.

According to the present invention, there is provided a steam valve assembly having a main-steam stop valve, a steam control valve arranged downstream of the main-steam stop valve, and an intermediate flow path provided between, and connecting, the main-steam stop valve and the steam control valve, the main-steam stop valve comprising: a first casing having a first inlet port directing horizontally, and a first outlet port directing vertically and connected to the intermediate flow path, defining a first flow path between the first inlet port and the first outlet port, and having a first valve seat arranged in the first flow path; a first valve body configured to move up and down in the first casing and to contact and leave the first valve seat, thereby to close and open the first flow path; and a first valve stem connected to the first valve body, configured to slide up and down, penetrating the first casing, and configured to move away from the first outlet port when the first flow path is opened; the steam control valve comprising: a second casing having a second inlet port directing horizontally, connected to the intermediate flow path, and a second outlet port directing vertically and defining a second flow path between the second inlet port and the second outlet port, and having a second valve seat arranged in the second flow path; a second valve body configured to move up and down in the second casing and to contact and leave the second valve seat, thereby to close and open the second flow path; and a second valve stem connected to the second valve body, configured to slide up and down, penetrating the second casing, and configured to move away from the second outlet port when the second flow path is opened, wherein the intermediate flow path is configured to guide main steam from the first outlet port in vertically downward direction to the second inlet port in horizontal direction.

According to the present invention, there is also provided a steam turbine plant having a boiler, a steam turbine configured to receive main steam generated in the boiler and to be driven with the main steam, and a steam valve assembly arranged between the boiler and the steam turbine and configured to control a flow of the main steam, wherein the steam valve assembly has a main-steam stop valve, a steam control valve arranged downstream of the main-steam stop valve, and an intermediate flow path provided between, and connecting, the main-steam stop valve and the steam control valve, the main-steam stop valve comprising: a first casing having a first inlet port directing horizontally, and a first outlet port directing vertically and connected to the intermediate flow path, defining a first flow path between the first inlet port and the first outlet port, and having a first valve seat arranged in the first flow path; a first valve body configured to move up and down in the first casing and to contact and leave the first valve seat, thereby to close and open the first flow path; and a first valve stem connected to the first valve body, configured to slide up and down, penetrating the first casing, and configured to move away from the first outlet port when the first flow path is opened; the steam control valve comprising: a second casing having a second inlet port directing horizontally, connected to the intermediate flow path, and a second outlet port directing vertically and defining a second flow path between the second inlet port and the second outlet port, and having a second valve seat arranged in the second flow path; a second valve body configured to move up and down in the second casing and to contact and leave the second valve seat, thereby to close and open the second flow path; and a second valve stem connected to the second valve body, configured to slide up and down, penetrating the second casing, and configured to move away from the second outlet port when the second flow path is opened, the intermediate flow path being configured to guide main steam from the first outlet port in vertically downward direction to the second inlet port in horizontal direction.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Figure 1:
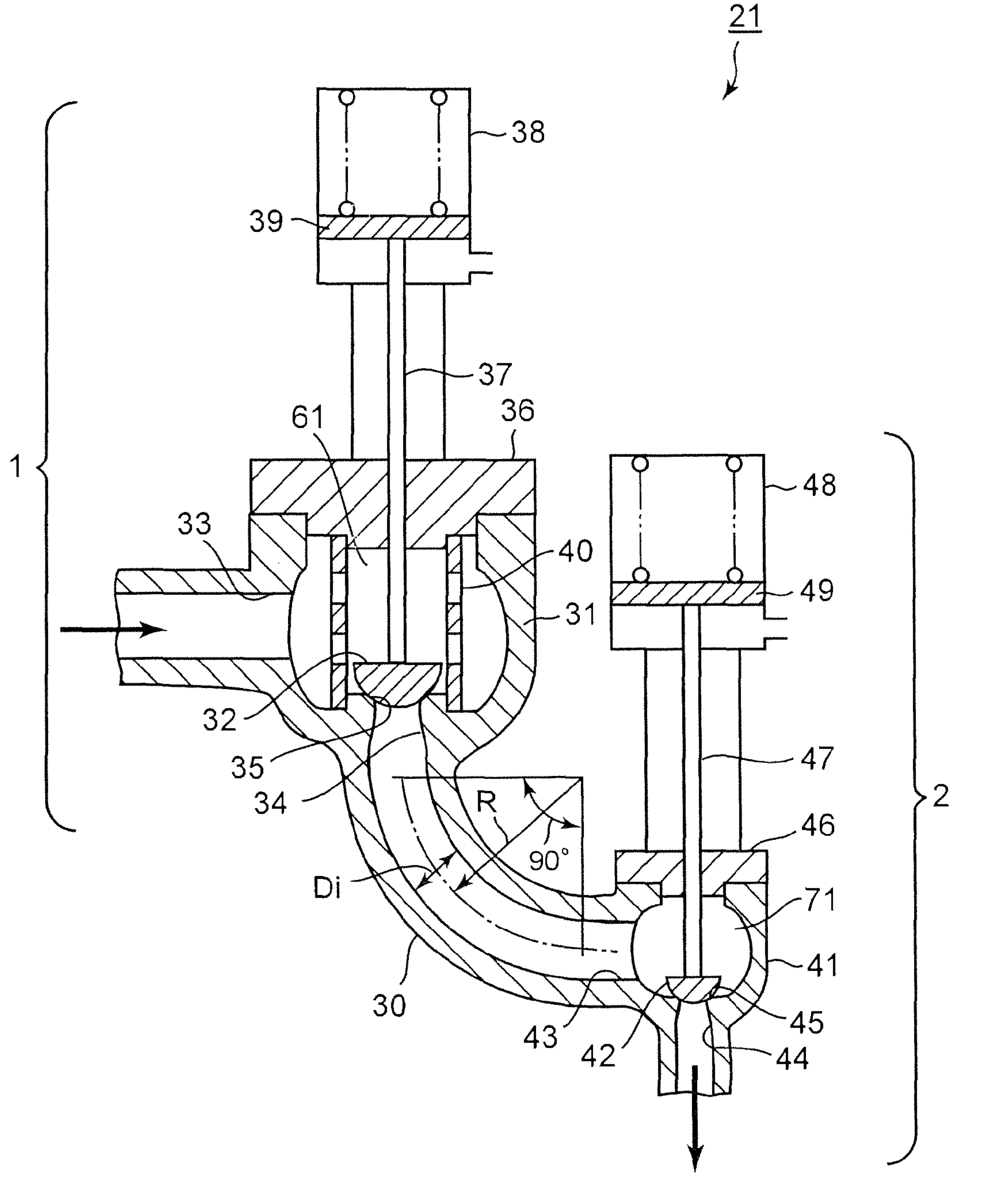
FIG. 1 is a vertical sectional view showing a first embodiment of a steam valve assembly according to the present invention.

Embodiments of the present invention will be described with reference to the accompanying drawings. The components of an embodiment, which are identical or similar to those of any other embodiment, are designated at the same reference numerals in each drawing and will not be described repeatedly.

First Embodiment

Figure 2:
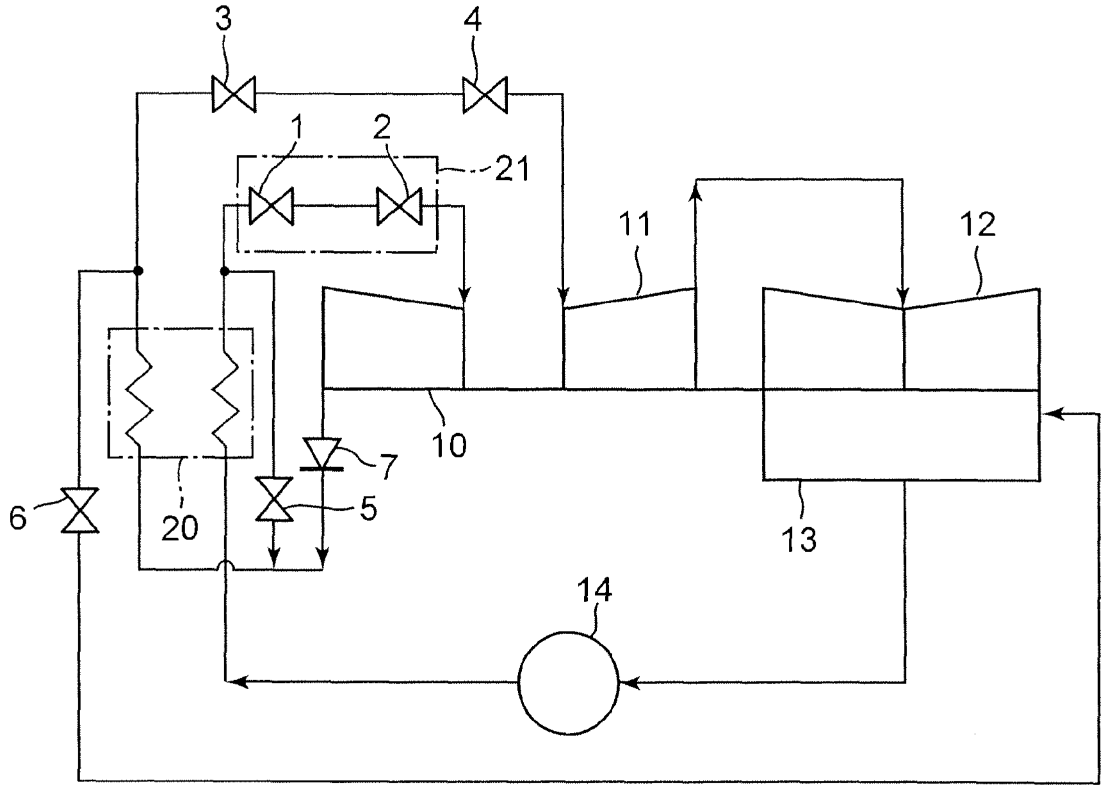
FIG. 2 is a system diagram showing a steam turbine plant that has a steam valve assembly according to the present invention.

FIG. 1 is a vertical sectional view showing a first embodiment of a steam valve assembly according to the present invention. FIG. 2 is a system diagram showing a steam turbine plant that has the steam valve assembly according to the present invention.

The steam turbine plant is so designed that, as shown in FIG. 2, the steam flowing from a boiler 20 is supplied to a high-pressure steam turbine 10 via the steam valve assembly 21. The steam valve assembly 21 has a main-steam stop valve 1 and a steam control valve 2 arranged downstream of the main-steam stop valve 1. The steam that has done work in a high-pressure steam turbine 10 flows through a check valve 7 back into the boiler 20. In the boiler 20, the steam is heated again by a re-heater. The re-heated steam flows through a re-heated steam stop valve 3 and an intercept valve 4 into an intermediate-pressure steam turbine 11, and then to a low-pressure steam turbine 12. Thus, the steam performs work in both the intermediate-pressure steam turbine 11 and the low-pressure steam turbine 12. The steam coming from the low-pressure steam turbine 12 flows into a condenser 13. The condenser 13 changes the steam into water. The condensed water is pumped up into the boiler 20 by a feed water pump 14.

In the configuration of FIG. 2, a high-pressure turbine bypass valve 5 extends from the upstream side of the main-steam stop valve 1 to the upstream side of the re-heater of the boiler 20, and a low-pressure turbine bypass valve 6 extends from the downstream side of the re-heater of the boiler 20 to the condenser 13. These bypass valves 5 and 6 are provided to increase the operating efficiency of the steam turbine plant. They enable the boiler system to operate by itself circulating steam, whether the turbines are operating or not.

As FIG. 1 shows the steam valve assembly 21 according to this embodiment has a main-steam stop valve 1, a steam control valve 2, and an intermediate flow path 30 connecting the valves 1 and 2. The main-steam stop valve 1 is provided at the upstream side of the steam control valve 2. Both the main-steam stop valve 1 and the steam control valve 2 are of the vertical (standing vertical) type. Note that FIG. 1 shows the main-steam stop valve 1 and the steam control valve 2, both in closed state.

The main-steam stop valve 1 has a first casing 31 and a first valve body 32. The first casing 31 defines a first flow path 61. The first valve body 32 can move up and down in the first casing 31. The first casing 31 has a first inlet port 33 and a first outlet port 34. The first inlet port 33 directs horizontally and guides steam into the first casing 31. The first outlet port 34 directs vertically and guides steam downward from the first casing 31. A first valve seat 35 is arranged in the first outlet port 34, bulging inwards. As the first valve body 32 moves up, the first valve body 32 leaves the first valve seat 35, opening the first flow path 61. Conversely, as the first valve body 32 moves down, the first valve body 32 contacts the first valve seat 35, closing the first flow path 61.

A first valve cover 36 is arranged on the top of the first casing 31. The first valve cover 36 can be opened to facilitate the maintenance work. A first valve stem 37 is fixed to the first valve body 32. The first valve stem 37 extends upward from the first valve body 32, penetrates the first valve cover 36 of the first casing 31 and is connected to a first piston 39 provided in a first hydraulic cylinder 38. The first valve stem 37 is located, opposing the first outlet port 34 across the first valve body 32. The first valve stem 37 can be moved upward away from the first outlet port 34 in order to move the first valve body 32 away from the first valve seat 35 (thereby to open the first flow path 61). In the first casing 31, a strainer 40 is arranged, surrounding the first valve body 32.

The steam control valve 2 is almost identical in structure to the main-steam stop valve 1. The steam control valve 2 has a second casing 41 and a second valve body 42. The second casing 41 defines a second flow path 71. The second valve body 42 can move up and down in the second casing 41. The second casing 41 has a second inlet port 43 and a second outlet port 44. The second inlet port 43 directs horizontally and guides steam into the second casing 41. The second outlet port 44 directs vertically and guides steam downward from the second casing 41. A second valve seat 45 is arranged in the second outlet port 44, bulging inwards. As the second valve body 42 moves up, the second valve body 42 leaves the second valve seat 45, opening the second flow path 71. Conversely, as the second valve body 42 moves down, the second valve body 42 contacts the second valve seat 45, closing the second flow path 71.

A second valve cover 46 is arranged on the top of the second casing 41. The second valve cover 46 can be opened to facilitate the maintenance work. A second valve stem 47 is fixed to the second valve body 42. The second valve stem 47 extends upward from the second valve body 42, penetrates the second valve cover 46 and is connected to a second piston 49 provided in a second hydraulic cylinder 48. The second valve stem 47 is located, opposing the second outlet port 44 across the second valve body 42. The second valve stem 47 can be moved upward away from the second outlet port 44 in order to move the second valve body 42 away from the second valve seat 45 (thereby to open the second flow path 71).

The intermediate flow path 30 defines one arcuate elbow that connects the first outlet port 34 and the second inlet port 43. The intermediate flow path 30 has a bending angle of 90°.

To prevent flow separation in the intermediate flow path (elbow) 30, the ratio (R/Di) of the radius R of curvature of the intermediate flow path 30 to the inner diameter Di of the intermediate flow path 30 should be as large as possible. The radio R/Di is preferably 1 or more, more preferably 2 or more.

In this embodiment, the first casing 31 of the main-steam stop valve 1, the second casing 41 of the steam control valve 2 and the intermediate flow path 30 can be formed as a single unit, by means of forging or casting.

The steam valve assembly 21 so configured as described above, the main steam supplied from the boiler 20 (FIG. 2) flows horizontally through the first inlet port 33 into the first casing 31 of the main-steam stop valve 1. Then, the steam flows into the strainer 40, passes through the gap between the first valve body 32 and the first valve seat 35, flows downward through the outlet port 34, and passes through the main-steam stop valve 1. After passing through the main-steam stop valve 1, the main steam flows through the intermediate flow path 30. While flowing through the intermediate flow path 30, the main steam changes its direction, from a downward direction to a horizontal direction. Thus, it horizontally flows through the second inlet port 43 into the second casing 41 of the steam control valve 2. In the second casing 41, the steam passes through the gap between the second valve body 42 and the second valve seat 45. Thus, the steam flows downward through the second outlet port 44, passing through the steam control valve 2.

The first valve body 32 of the main-steam stop valve 1 moves up and down as the first valve stem 37 so moves. When the main-steam stop valve 1 is fully open, the first valve stem 37 is pulled in upstream direction, not disturbing the main-steam flow path at all. The pressure loss attributable to the first valve 37 is therefore minimized. Similarly, the second valve body 42 of the steam control valve 2 moves up and down as the second valve stem 47 so moves. When the steam control valve 2 is fully open, the second valve stem 47 is pulled in upstream direction, not disturbing the steam flow path at all. The pressure loss attributable to the second valve 47 is therefore minimized.

In this embodiment, both the main-steam stop valve 1 and the steam control valve 2 can be of vertical (standing vertical) type. As a result, the valve stems do not bend by the weight of the valve bodies, while the valves are assembled and disassembled. Therefore, the valve bodies at the distal ends of the valve stems can easily be set into contact with the valve seats. In addition, the internal components, such as hydraulic cylinders and top covers, can be hoisted up and down in vertical position when overhauling the valves, by using ceiling cranes. This helps to perform the maintenance work in safety.

Generally, a centrifugal force acts on fluid that is flowing in an elbow. The centrifugal force exerted on that part of the fluid, which flows fast along the center part of the elbow, is larger than the force exerted on that part of the fluid, which slowly flows near the wall of the elbow. Hence, the fluid flowing along the center part moves outward to the outer circumference of the elbow, while the fluid flowing near the wall moves inwards. Besides, the pressure distribution in the cross section of the elbow is not uniform, and the pressure is higher at the outer circumference of the elbow and lower at the inner circumference of the elbow. Consequently, a secondary flow is generated in the elbow. The secondary flow causes flow separation as a consecutive flow of the secondary flow, which will be described below.

(1) Along the outer circumference of the elbow, the pressure gradually rises toward the bending part of the elbow. Therefore, flow separation develops at the entrance of the bending part of the elbow.

(2) Along the inner circumference of the elbow, the pressure is lower. At the end (exit part) of the elbow, the centrifugal force decreases and the pressure starts rising. As a result, the flow undergoes separation after passing the bending part of the elbow.

A greater part of the steam-pressure loss in the intermediate flow path (the elbow) 30 is attributable to the flow separation in the elbow. The flow separation in the intermediate flow path (the elbow) 30 can be avoided if the ratio (R/Di) of the radius R of curvature of the intermediate flow path 30 to the inner diameter Di of the intermediate flow path 30 is set to 1 or more, preferably 2 or more. Thus, the pressure loss in the intermediate flow path 30 can be reduced.

Second Embodiment

Figure 3:
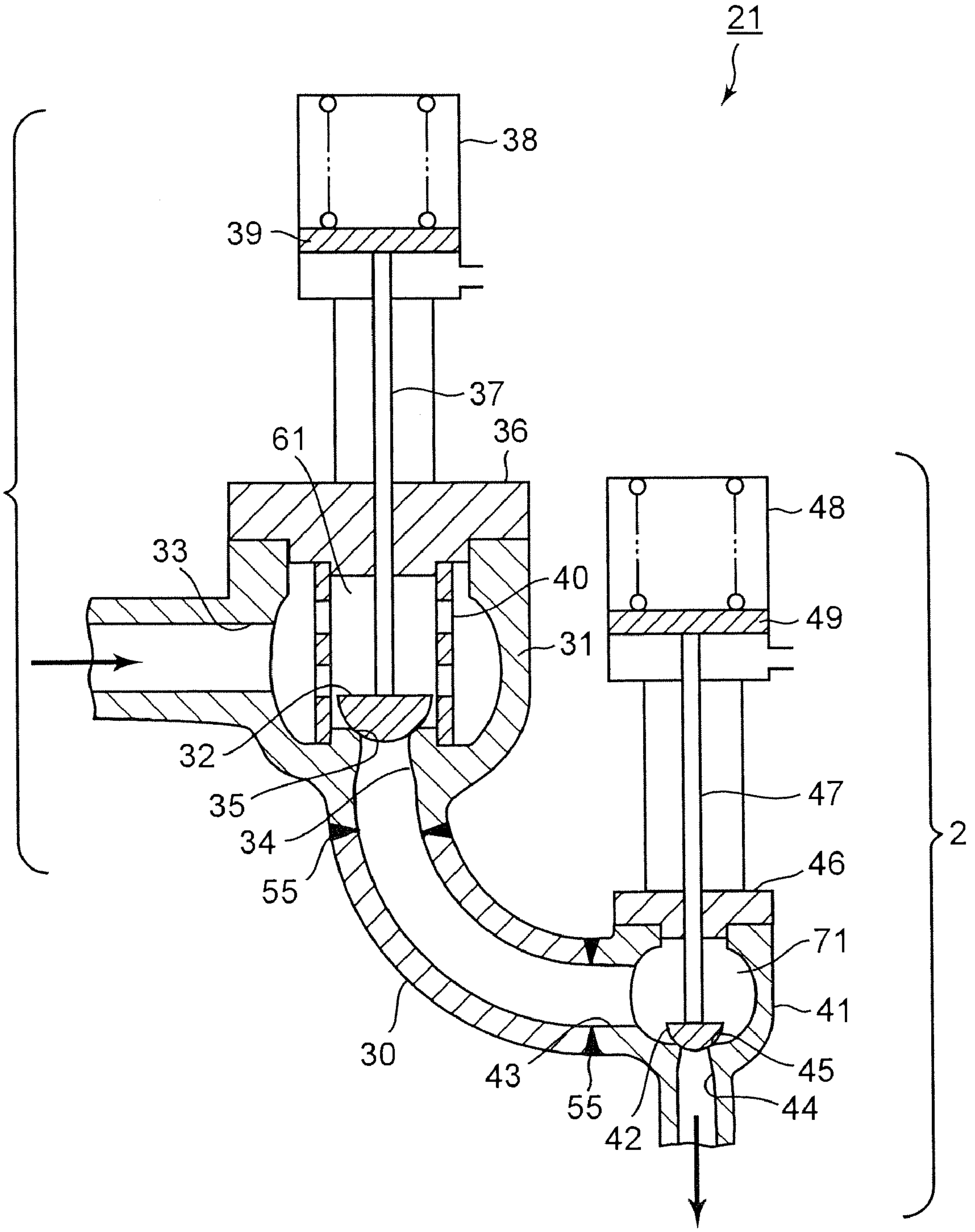
FIG. 3 is a vertical sectional view showing a second embodiment of a steam valve assembly according to the present invention.

FIG. 3 is a vertical sectional view showing a second embodiment of the steam valve assembly according to the present invention. The steam valve assembly 21 according to the second embodiment is almost identical in structure to the steam valve assembly according to the first embodiment.

During the manufacture of the second embodiment, however, the main-steam stop valve 1, the steam control valve 2, and the intermediate flow path 30 are formed as separate units, each by means of forging or casting. Thereafter, the first casing 31 of the main-steam stop valve 1, the intermediate flow path 30, and the second casing 41 of the steam control valve 2 are connected by, for example, welding, at the junctions 55.

Fluid is known to flow in such a complex manner as explained in conjunction with the first embodiment. Centrifugal force is applied on that part of fluid, which flows along the center part of the intermediate flow path 30. This part of the fluid is pushed outward to the outer circumference of the intermediate flow path 30. Inevitably, the inner surface of the intermediate flow path 30 is locally corroded.

To prevent this local corrosion, the intermediate flow path 30 is made of material different from that of the first casing 31 of the main-steam stop valve 1 and the second casing 41 of the steam control valve 2. More precisely, the intermediate flow path 30 may be made of material that contains nickel or chromium and is therefore resistant to corrosion. The intermediate flow path 30 made of such material, first casing 31 and second casing 41 are welded together, forming an integral unit.

The first casing 31 of the main-steam stop valve 1 and the second casing 41 of the steam control valve 2 may be castings of chromium-molybdenum-vanadium. The material contains chromium and molybdenum, which enhances strength at high temperature. The material also contains vanadium for suppressing the surface instability of the material, which results from the use of chromium and molybdenum. Casting is the most appropriate method of manufacturing the first casing 31 and second casing 41, because these components have complicated shapes.

To raise the operating efficiency of the power plant, the steam passing through the steam valves is to be heated to 600° C. or more. If the steam is so heated, however, the conventional chromium-molybdenum-vanadium casing cannot withstand the steam in terms of strength. Forged steel components having high chromium content, which have no internal defects, should be used instead as new material.

To cope with this future trend of steam-temperature increase at inlet ports, the first casing 31, the second casing 41 and the intermediate flow path 30 should better be separately made in the form of forged or cast components and be welded together to provide an integral unit.

These components may be made in the form of a single cast component as has been hitherto practiced. Such a cast component has a complicated shape, being constituted of parts different in wall thickness. Consequently, when the steam turbine is activated, large thermal stresses may inevitably develop in the cast component due to a difference between the temperature at the outer surface and the temperature at the inner surface. By contrast, in this embodiment, the combination of the first casing 31, the second casing 41 and the intermediate flow path 30, which are forged or cast components, has a uniform wall thickness and is therefore strong enough.

Third Embodiment

Figure 4:
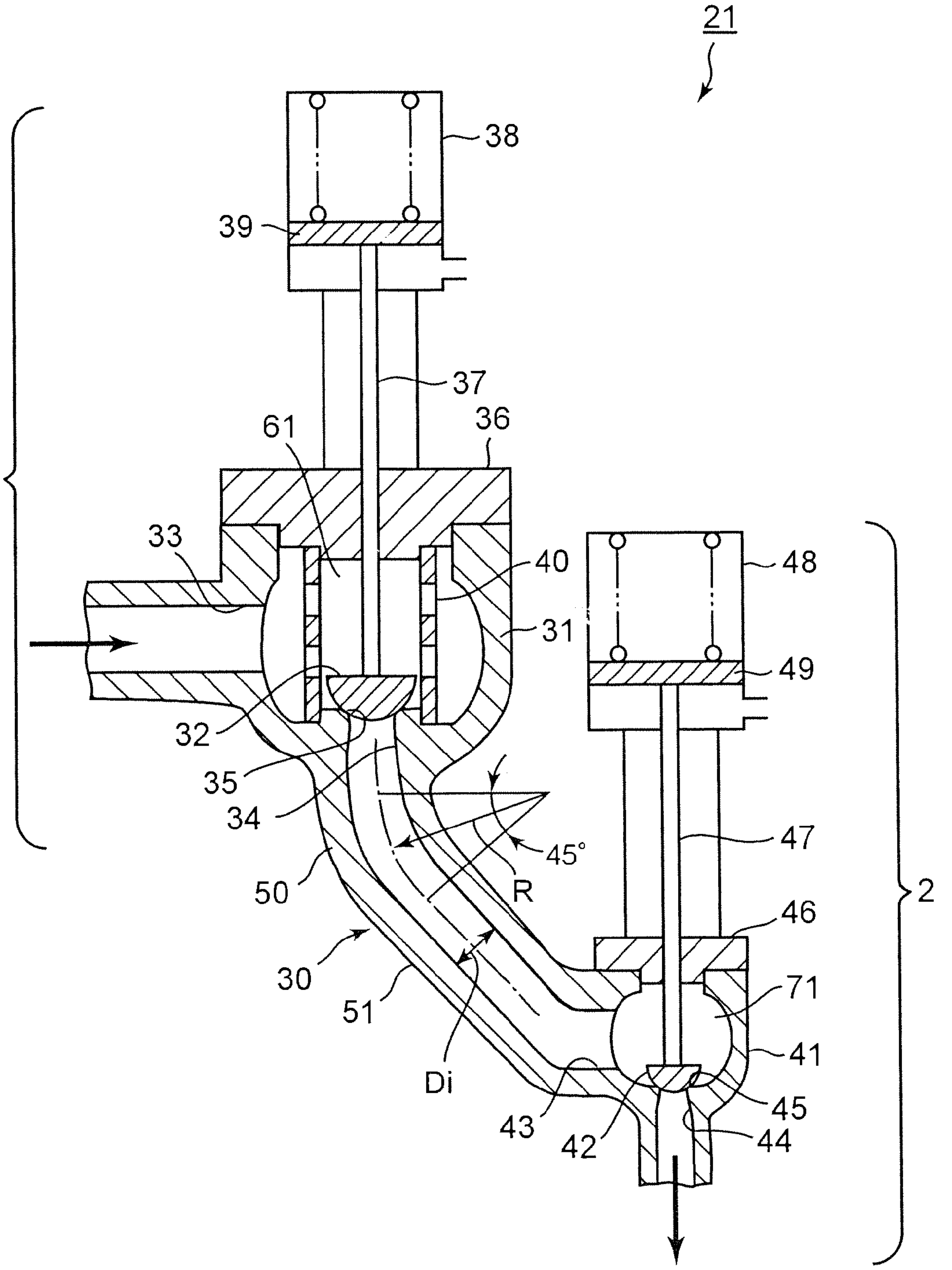
FIG. 4 is a vertical sectional view showing a third embodiment of the steam valve assembly according to the present invention.

FIG. 4 is a vertical sectional view showing a third embodiment of the steam valve assembly according to the present invention. This embodiment is a modification of the first embodiment. In the first embodiment, the intermediate flow path has one arcuate elbow having a bending angle of 90°. In the third embodiment, the intermediate flow path 30 is a combination of an arcuate elbow 50 and a straight flow-path part 51. The elbow 50 is connected to the outlet port (first outlet port) 34 of the main-steam stop valve 1 and has a bending angle of 45°. The straight flow-path part 51 is connected to the lower end of the elbow 50 and obliquely extends downward.

In this embodiment, the flow separation of the steam flowing in the elbow can be more suppressed, and the pressure loss can be further reduced. The ratio (R/Di) of the radius R of curvature of the elbow 50 to the inner diameter Di of the elbow 50 should preferably be 2 or more as in the first embodiment. Further, in this embodiment shown in FIG. 4, two elbows 50, each having a bending angle of 45°, are connected by one straight flow-path part 51, and the total bending angle is therefore 90°. Moreover, three or more elbows 50 and a plurality of straight flow-paths 51 may be combined to provide an intermediate flow path 30.

Other Embodiments

The embodiments described above are no more than examples and they do not limit the present invention. The embodiments described above may be used in any possible combinations. In the third embodiment, for example, the main-steam stop valve 1, steam control valve 2 and intermediate flow path 30 may be made as a single unit by forging or casting, as in the first embodiment or they may be prepared as separate components, each by forging or casting, and then connected together by welding, as in the second embodiment.

Furthermore, each embodiment described above may be turned upside down.

What is claimed is:

1. A steam valve assembly having a main-steam stop valve, a steam control valve arranged downstream of the main-steam stop valve, and an intermediate flow path provided between, and connecting, the main-steam stop valve and the steam control valve, the main-steam stop valve comprising:

a first casing having a first inlet port directing horizontally, and a first outlet port directing vertically and connected to the intermediate flow path, defining a first flow path between the first inlet port and the first outlet port, and having a first valve seat arranged in the first flow path;

a first valve body configured to move up and down in the first casing and to contact and leave the first valve seat, thereby to close and open the first flow path; and a first valve stem connected to the first valve body, configured to slide up and down, penetrating the first casing, and configured to move away from the first outlet port when the first flow path is opened;

the steam control valve comprising:

a second casing having a second inlet port directing horizontally, connected to the intermediate flow path, and a second outlet port directing vertically and defining a second flow path between the second inlet port and the second outlet port, and having a second valve seat arranged in the second flow path;

a second valve body configured to move up and down in the second casing and to contact and leave the second valve seat, thereby to close and open the second flow path; and a second valve stem connected to the second valve body, configured to slide up and down, penetrating the second casing, and configured to move away from the second outlet port when the second flow path is opened, wherein the intermediate flow path is configured to guide main steam from the first outlet port in vertically downward direction to the second inlet port in horizontal direction, and wherein the first outlet port and the second outlet port open downward, the first valve stem penetrates a top part of the first casing and extends upwards, and the second valve stem penetrates a top part of the second casing and extends upwards.

2. The steam valve assembly according to clam 1, wherein the first casing, the second casing and the intermediate flow path have been formed by forging or casting as an integral unit.

3. The steam valve assembly according to clam 1, wherein the first casing, the second casing and the intermediate flow path have been formed as separate units and have then been connected together.

4. The steam valve assembly according to clam 1, wherein the intermediate flow path is arcuate and has a bending angle of 90°.

5. The steam valve assembly according to clam 1, wherein the intermediate flow path has a straight flow-path part and an arcuate flow-path part.

6. A steam turbine plant having a boiler, a steam turbine configured to receive main steam generated in the boiler and to be driven with the main steam, and a steam valve assembly arranged between the boiler and the steam turbine and configured to control a flow of the main steam, wherein the steam valve assembly has a main-steam stop valve, a steam control valve arranged downstream of the main-steam stop valve, and an intermediate flow path provided between, and connecting, the main-steam stop valve and the steam control valve, the main-steam stop valve comprising:

a first casing having a first inlet port directing horizontally, and a first outlet port directing vertically and connected to the intermediate flow path, defining a first flow path between the first inlet port and the first outlet port, and having a first valve seat arranged in the first flow path;

a first valve body configured to move up and down in the first casing and to contact and leave the first valve seat, thereby to close and open the first flow path; and a first valve stem connected to the first valve body, configured to slide up and down, penetrating the first casing, and configured to move away from the first outlet port when the first flow path is opened;

the steam control valve comprising:

a second casing having a second inlet port directing horizontally, connected to the intermediate flow path, and a second outlet port directing vertically and defining a second flow path between the second inlet port and the second outlet port, and having a second valve seat arranged in the second flow path;

a second valve body configured to move up and down in the second casing and to contact and leave the second valve seat, thereby to close and open the second flow path; and a second valve stem connected to the second valve body, configured to slide up and down, penetrating the second casing, and configured to move away from the second outlet port when the second flow path is opened, the intermediate flow path being configured to guide main steam from the first outlet port in vertically downward direction to the second inlet port in horizontal direction.

7. A steam valve assembly having a main-steam stop valve, a steam control valve arranged downstream of the main-steam stop valve, and an intermediate flow path provided between, and connecting, the main-steam stop valve and the steam control valve, the main-steam stop valve comprising:

a first casing having a first inlet port directing horizontally, and a first outlet port directing vertically and connected to the intermediate flow path, defining a first flow path between the first inlet port and the first outlet port, and having a first valve seat arranged in the first flow path;

a first valve body configured to move up and down in the first casing and to contact and leave the first valve seat, thereby to close and open the first flow path; and a first valve stem connected to the first valve body, configured to slide up and down, penetrating the first casing, and configured to move away from the first outlet port when the first flow path is opened;

the steam control valve comprising:

a second casing having a second inlet port directing horizontally, connected to the intermediate flow path, and a second outlet port directing vertically and defining a second flow path between the second inlet port and the second outlet port, and having a second valve seat arranged in the second flow path;

a second valve body configured to move up and down in the second casing and to contact and leave the second valve seat, thereby to close and open the second flow path; and second valve stem connected to the second valve body, configured to slide up and down, penetrating the second casing, and configured to move away from the second outlet port when the second flow path is opened, wherein the intermediate flow path is configured to guide main steam from the first outlet port in vertically downward direction to the second inlet port in horizontal direction, and wherein the intermediate flow path is arcuate and has a bending angle of 90°.

8. The steam valve assembly according to claim 7, wherein the first casing, the second casing and the intermediate flow path have been formed by forging or casting as an integral unit.

9. The steam valve assembly according to claim 7, wherein the first casing, the second casing and the intermediate flow path have been formed as separate units and have then been connected together.

10. The steam valve assembly according to claim 7, wherein the intermediate flow path has a straight flow-path part and an arcuate flow-path part.

* * * * *